United States Patent [19]

Meunier

[11] Patent Number: 4,612,213
[45] Date of Patent: Sep. 16, 1986

[54] NICKEL OXIDE BATTERY CATHODE PREPARED BY OZONATION

[75] Inventor: Hubert G. Meunier, Holden, Mass.

[73] Assignee: The United States of America as represented by the Secretary of the Navy, Washington, D.C.

[21] Appl. No.: 411,171

[22] Filed: Aug. 25, 1982

[51] Int. Cl.[4] .............................. B05D 5/12
[52] U.S. Cl. ...................... 427/126.6; 427/246; 427/247; 427/248.1; 427/435; 429/223
[58] Field of Search ............... 427/126.6, 246, 247, 427/343, 248.1, 435; 429/223; 204/2.1

[56] References Cited

U.S. PATENT DOCUMENTS

| | | | |
|---|---|---|---|
| 3,597,829 | 8/1971 | Wagner | 429/223 |
| 3,911,094 | 10/1975 | Megahed et al. | 429/223 |
| 3,990,910 | 11/1976 | Giner et al. | 429/223 |
| 4,330,603 | 5/1972 | Jackovitz et al. | 429/223 |

FOREIGN PATENT DOCUMENTS 54-4335  1/1979  Japan ................ 429/223

Primary Examiner—Richard Bueker
Attorney, Agent, or Firm—Robert F. Beers; Arthur A. McGill; Michael J. McGowan

[57] ABSTRACT

A stable tetravalent nickel oxide cathode, having a high coulombic capacity, for use in high energy density batteries comprising a nickel hydroxide plate prepared by impregnating a porous conducting plaque with nickel hydroxide which is then further wet oxidized by passing a stream of ozone through the plate. The ozonation process further comprises impregnation of the nickel hydroxide plate with an alkaline solution such as an aqueous solution of potassium hydroxide and flowing of a stream of gaseous ozone through the plate by producing a pressure differential across the plate while applying water or potassium hydroxide solution to the plate to facilitate the action of the ozone on the nickel hydroxide-potassium hydroxide mixture. The tetravalent nickel oxide thus formed has the stable gamma structure with a valence approaching +4.0.

6 Claims, 2 Drawing Figures

POTENTIAL OF NiO vs AgO
IN 20% KOH AT 55°C AND
CONSTANT CURRENT DENSITY
OF .67 AMP/IN$^2$

△ NiO EAGLE PICHER
⊙ AgO

NICKEL OXIDE BATTERY CATHODE PREPARED BY OZONATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to high energy cathodic battery plates having a high discharge rate and more particularly to a process for producing stable nickel oxide cathodes having a valence approaching +4.0 and hence a high coulombic capacity for use in high energy density batteries.

(2) Description of the Prior Art

It is well known that a serious deficiency of nickel oxide cathodes is their instability as regards loss of capacity. Furthermore, the valence of nickel in the charged state is about +3 resulting in less than optimum coulombic capacity. Present nickel oxide cathodes are generally prepared by electrochemical oxidation. Some cathodes have also been fabricated from nickel oxide powders prepared by wet methods of oxidation, for example, persulfate oxidation. These nickel oxide cathodes have not however been suitable for high energy density applications due to the inherent instability, low capacity and lower power output of +3 valence nickel oxide. Stable nickel oxide powders having a valence approaching +4.0 have been prepared by ozonation. However, forming such powders into a cathode plate has not been successful in meeting the requirements of a high energy density battery. Such processes, for instance using adhesives or sintering, do not result in cathodes in which the electrochemical properties of nickel oxide have been maximized and fully exploited.

What is needed is a nickel oxide cathode plate which is stable, has high power density, contains nickel oxide whose valence approaches +4.0 to provide an electrode whose coulombic capacity is nearly double that of an electrode containing only +3 valence nickel oxide and is thus suitable for use in high energy density batteries, possibly as a substitute for presently used high-cost silver oxide cathodes.

SUMMARY OF THE INVENTION

Accordingly, it is a general purpose and object of the present invention to provide a stable cathode plate. It is a further object to provide a cathode plate with a high coulombic capacity. Another object is to provide a cathode plate having a high discharge rate. A still further object is to have a plate suitable for use in high energy density batteries. Still another object is to provide a high energy metal oxide plate which can be used in lieu of silver oxide.

These objects are accomplished with the present invention by providing a stable, nickel oxide cathode, having a valence approaching +4.0 and hence a high coulombic capacity, for use in high density batteries comprising a nickel hydroxide plate prepared by impregnating a porous, highly conductive, nickel plaque with nickel hydroxide which is then oxidized by passing a stream of ozone through the plate. The ozonation process further comprises impregnation of the plate with an alkaline solution such as an aqueous solution of potassium hydroxide, flowing of a stream of gaseous ozone through the plate by producing pressure differential across the plate and applying water or potassium hydroxide solution to the plate during ozonation to facilitate the action of the ozone on the nickel hydroxide-potassium hydroxide mixture. The nickel oxide formed using this process has the stable gamma structure with a valence approaching +4.0.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing wherein.

DESCRIPTION OF THE PREFERRED EMBODIMENT

The instant invention comprises a process for producing stable, tetravalent, nickel oxide cathode plates having high coulombic capacity and high discharge rates. The process commences by impregnating a thin porous conducting matrix such as a nickel plaque with a soluble nickel salt such as $Ni(NO_3)_2$ in solution which is subsequently converted to nickel hydroxide. The impregnated plaque, referred to now as a plate, is next treated with an aqueous or alcoholic solution of a strong base such as potassium hydroxide (KOH) or the like, and the solvent removed by drying, thereby depositing the strong base throughout the matrix substrate. The plate is then treated with a controlled amount of moisture to prepare it for ozonation. Plate porosity, weight percentage of nickel salt and strong base in solution, and the total weight of $Ni(OH)_2$ deposited in the plate pores all vary the reaction time required to form the tetravalent NiOOH but establishing the range of these parameters necessary to maximize the amount of tetravalent NiOOH in the plate is well within the scope of knowledge of one skilled in the art.

Figure 1:
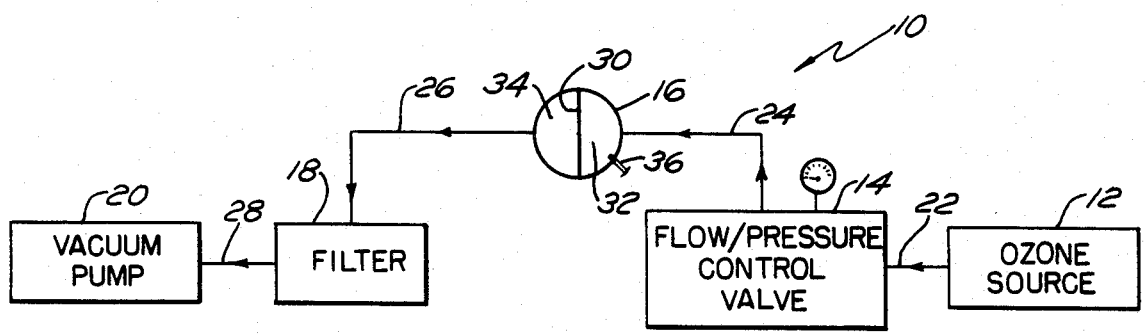
FIG. 1 shows a block diagram of a cathode ozonating system suitable for carrying out subject invention.

Referring now to FIG. 1 there is shown a block diagram of a cathode ozonating arrangement 10 which comprises an ozone source 12, a flow/pressure control valve 14, a cathode ozonating fixture 16, a filter 18 and a vacuum pump 20. Ozone source 12 connects to flow/pressure control valve 14 by means of tube 22. Valve 14 connects to ozonating fixture 16 by means of tube 24. Filter 18 connects to ozonating fixture 16 by means of tube 26. Filter 18 also connects to vacuum pump 20 by means of tube 28. Moisture treated plate 30, is inserted in ozonating fixture 16, forming two chambers, 32 and 34 which are isolated from each other in all respects except to the extent determined by plate 30's porosity. Tube 24 connects to chamber 32 which receives ozone under pressure from ozone source 12. Tube 26 connects to chamber 34 which is evacuated by vacuum pump 20. The pressure differential across plate 30 facilitates the flow of ozone through the plate. The moisture level of plate 30 is maintained during the process by an intermittent or continuous light spray of water or aqueous base solution from nozzle 36. The result of this process is a cathode containing a high proportion of tetravalent nickel oxide exhibiting the desired properties.

The general nature of the invention having been set forth, the following example is presented as a specific illustration thereof. It will be understood that the invention is not limited to this specific example but is susceptible to various modifications that will be recognized by one of ordinary skill in the art.

EXAMPLE 1

A thin plate, 2.0 in.×1.75 in.×0.030 in. thick, weighing about 4.84 grams total of which about 2.9 grams is nickel hydroxide, was obtained from Eagle Picher Industries. This plate was immersed in a 50 percent aqueous solution of potassium hydroxide for 2 hours then removed and placed in an oven to dry. The weight increase after drying was about 0.391 grams. The plate was then set in cathode ozonating fixture 16 for reaction with ozone. The plate was mounted in fixture 16 so as to be perpendicular to the direction of the ozone flow and, at the same time, serve as the partition between inlet chamber 32 and outlet chamber 34 of fixture 16. Next, fixture 16 was placed within an arrangement 10 such as shown in FIG. 1. The outlet tube 26 and hence one side of the plate was connected to a reduced pressure maintained by vacuum pump 20; the inlet tube 24 and hence the other side of the plate was connected to ozone source 12 (PCI Ozone Corp. Model C2P-3) which supplied a mixture of ozone in oxygen at a pressure in excess of the outlet side pressure. A flow of ozone through the plate was maintained at a rate controlled by adjusting the pressure differential across the surfaces. Prior to commencing the reaction the plate was moistened with a 50 percent aqueous solution of potassium hydroxide after which the ozonation was begun by flowing ozone at a rate of about 0.5 gm/hr. At 30 minute intervals the plate was remoistened with aqueous potassium hydroxide. The reaction was continued for 4 hours before the plate was removed. Subsequent analysis of the plate confirmed the presence of the tetravalent nickel oxide referred to as $\gamma$-NiOOH.

EXAMPLE 2

Figure 2:
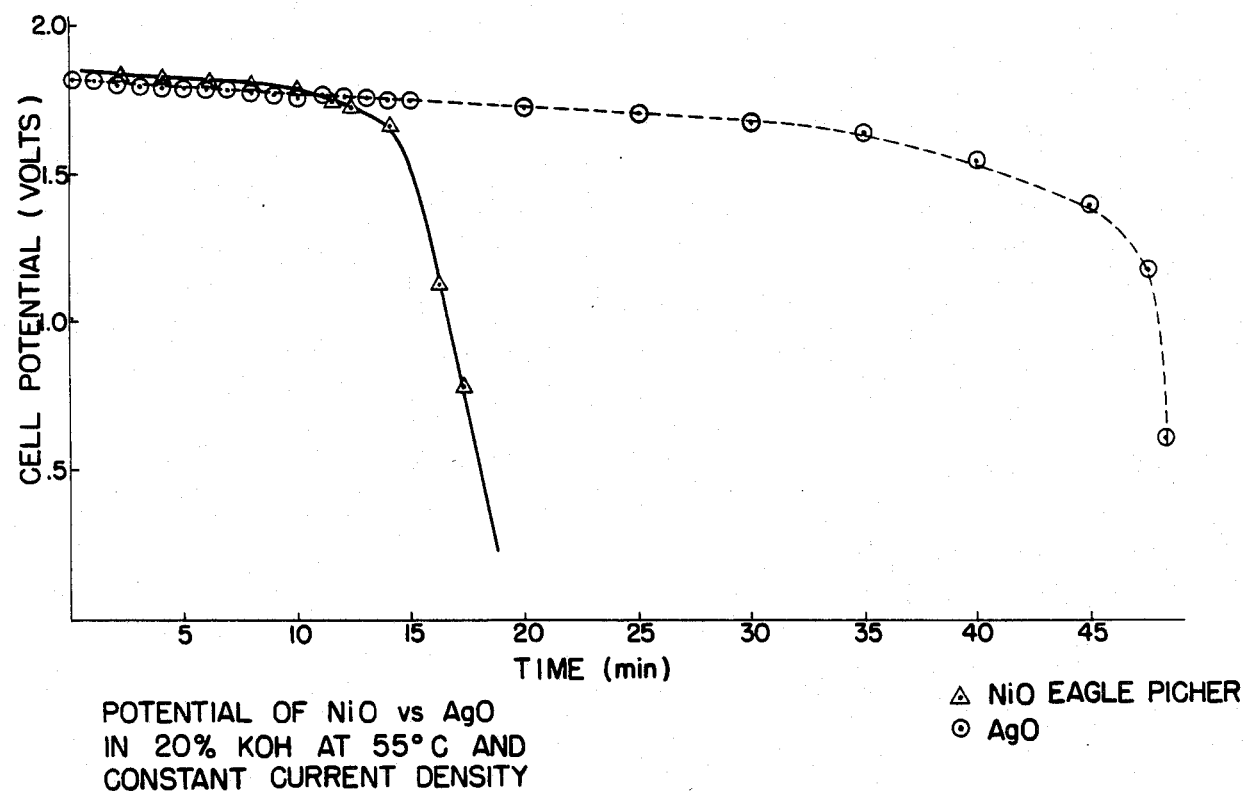
FIG. 2 shows a graphical representation of the performance of a cathode built according to the teachings of this invention.

The nickel oxide plate of EXAMPLE 1 was evaluated as a cathode by constructing a cell 2 in.×1.5 in.×0.28 in. in which the anode was aluminum and the cathode was a 1.5 in.×1 in. tetravalent nickel oxide plate separated from the aluminum by a spacer 0.05 in. thick. The electrolyte, a 30 percent KOH solution containing 0.5 percent sodium stannate to suppress gassing, was maintained at about 60° C. and circulated between the electrodes during the operation of the battery. The battery was connected to a circuit and measurements of current and voltage taken during discharge. FIG. 2 shows a plot of cell voltage at a constant current of 1 ampere as a function of time. These data are compared in FIG. 2 with a similar discharge test for a silver oxide, aluminum battery under the same conditions. It should be noted that the silver oxide electrode had a much greater active amount of material and hence a longer discharge time. For purposes of this invention the comparison of the two curves between times 0 and about 15 minutes are pertinent. Over this interval the nickel oxide cathode proves to have the properties sought in high energy density batteries, and previously only achievable with silver oxide cathodes.

Advantages of the tetravalent nickel oxide plate prepared by ozonation over the previously built nickel oxide cathodes is that this invention yields a nickel oxide cathode which: (1) is stable, (2) contains nickel oxide having a valence approaching +4.0 deposited on a highly conductive substrate, and (3) can thus function as a cathode in a high energy density battery. The novel feature is the oxidation of a nickel hydroxide plate with ozone and the manner in which it is accomplished.

What has thus been described is a stable, nickel oxide cathode, having a valence approaching +4.0 and hence a high coulombic capacity, for use in high energy density batteries comprising a nickel hydroxide plate prepared by impregnating a porous, high conductive, nickel plaque with nickel hydroxide which is then oxidized by passing a stream of ozone through the plate. The ozonation process further comprises impregnation of the plate with an alkaline solution such as an aqueous solution of potassium hydroxide and flowing of a stream of gaseous ozone through the plate by producing a pressure differential across the plate while applying water or potassium hydroxide solution to the plate to facilitate the action of the ozone on the nickel hydroxide-potassium mixture. The nickel oxide thus formed has the stable gamma structure with a valence approaching +4.0.

Obviously many modifications and variations of the present invention may become apparent in light of the above teachings. For example: the method is applicable to the formation of any other metallic oxide plate such as silver, copper, or the like. Conducting substrates other than sintered metal powder such as graphite fibers or pressed metal wool, may be used for the plaque as long as the substrate is porous and the conductivity is capable of allowing a high discharge rate. The plaques may also be impregnated with electrochemical agents other than nickel.

In light of the above, it is therefore understood that within the scope of the appended claims, the invention may be practiced otherwise than as specifically described.

What is claimed is:

1. A method for producing a nickel oxide cathode for a high energy density battery consisting of the steps of:
   impregnating a porous conducting plaque with a soluble nickel salt such that a conducting plate having nickel hydroxide disposed therethrough is formed;
   next, treating said impregnated conducting plate with a strong alkaline solution such that a nickel salt-strong alkaline mixture is formed thereby;
   next, ozonating said impregnated conducting plate by passing a stream of gaseous ozone through said plate due to a pressure differential across said plate; and
   applying a liquid reagent over said impregnated conducting plate while ozonating to facilitate the action of the ozone on the nickel salt-strong alkaline mixture thereby directly converting said mixture to a tetravalent nickel oxyhydroxide with the stable gamma structure having a valence approaching four.

2. The method for producing a nickel oxide cathode according to claim 1 wherein impregnating said porous plaque further consists of the steps of:
   immersing said porous conducting plaque in a solution of said nickel salt such that all exterior surfaces and all voids are completely wetted by said salt solution; and precipitating nickel out of said salt solution thereby depositing Ni(OH)$_2$ throughout the substrate of said plaque so as to form said impregnated conducting plate.

3. The method for producing a nickel oxide cathode according to claim 2 wherein treating said impregnated conducting plate with a strong alkaline solution further consists of the steps of:

immersing said impregnated conducting plate in a solution containing a strong base; and oven drying said impregnated conducting plate to remove all solvent therefrom.

4. The method for producing a nickel oxide cathode according to claim 3 wherein ozonating said impregnated conducting plate further consists the steps of:

applying a preselected amount of an aqueous medium to said plate such that only a controlled amount of water is present;

connecting one side of said plate to a relatively low pressure; and connecting the opposite side of said plate to an ozone stream having a controlled moisture content, said ozone stream being maintained at a higher pressure than said relative low pressure thereby forcing said ozone stream through said plate so as to produce said tetravalent nickel oxyhydroxide.

5. The method for producing a Nickel oxide cathode according to claim 4 wherein said soluble nickel salt is Ni(NO$_3$)$_2$.

6. The method for producing a nickel oxide cathode according to claim 5 wherein said strong alkaline is KOH.

* * * * *